(12) United States Patent
Chiu

(10) Patent No.: US 8,204,333 B2
(45) Date of Patent: Jun. 19, 2012

(54) CONVERTING VIDEO AND IMAGE SIGNAL BIT DEPTHS

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 983 days.

(21) Appl. No.: 11/974,688

(22) Filed: Oct. 15, 2007

(65) Prior Publication Data

US 2009/0097763 A1 Apr. 16, 2009

(51) Int. Cl.
*G06K 9/40* (2006.01)
(52) U.S. Cl. .................................................. 382/261
(58) Field of Classification Search .................. 382/274, 382/275, 260–264
See application file for complete search history.

(56) References Cited

U.S. PATENT DOCUMENTS

| | | | | |
|---|---|---|---|---|
| 5,327,502 A * | 7/1994 | Katata et al. | ................... | 382/239 |
| 6,038,576 A * | 3/2000 | Ulichney et al. | .............. | 708/208 |
| 6,707,943 B2 * | 3/2004 | Gicquel et al. | ................. | 382/199 |
| 7,308,146 B2 * | 12/2007 | Becker et al. | ................... | 382/233 |
| 7,400,779 B2 * | 7/2008 | Daly et al. | ..................... | 382/261 |
| 7,424,166 B2 * | 9/2008 | Daly | ............................. | 382/263 |
| 7,471,847 B2 * | 12/2008 | Yano | ............................. | 382/274 |
| 7,650,042 B2 * | 1/2010 | Winger | .......................... | 382/260 |
| 7,747,100 B2 * | 6/2010 | Kim et al. | ..................... | 382/275 |
| 7,787,704 B2 * | 8/2010 | Daly et al. | ..................... | 382/261 |
| 2003/0016884 A1 * | 1/2003 | Altunbasak et al. | .......... | 382/299 |
| 2004/0184766 A1 | 9/2004 | Kim et al. | | |
| 2004/0263538 A1 * | 12/2004 | Ohta et al. | ..................... | 345/690 |
| 2005/0135694 A1 * | 6/2005 | Daly | ............................. | 382/254 |
| 2005/0141779 A1 * | 6/2005 | Daly | ............................. | 382/260 |
| 2005/0147317 A1 * | 7/2005 | Daly et al. | ..................... | 382/264 |
| 2005/0152614 A1 * | 7/2005 | Daly et al. | ..................... | 382/268 |
| 2005/0207492 A1 * | 9/2005 | Pao | ........................... | 375/240.16 |
| 2006/0072044 A1 * | 4/2006 | Kawamura et al. | ............ | 348/797 |
| 2006/0233438 A1 * | 10/2006 | Xu et al. | ....................... | 382/162 |
| 2006/0269159 A1 * | 11/2006 | Kim et al. | ..................... | 382/256 |
| 2007/0081193 A1 * | 4/2007 | Lee et al. | ...................... | 358/3.27 |
| 2007/0236610 A1 * | 10/2007 | Zhou et al. | .................... | 348/701 |
| 2007/0248280 A1 * | 10/2007 | Winger | .......................... | 382/275 |
| 2008/0263621 A1 * | 10/2008 | Austerlitz et al. | ............ | 725/139 |
| 2009/0003457 A1 | 1/2009 | Liu et al. | | |
| 2009/0087111 A1 | 4/2009 | Noda et al. | | |
| 2009/0097561 A1 | 4/2009 | Chiu et al. | | |

(Continued)

FOREIGN PATENT DOCUMENTS

JP 2005-051337 2/2005

(Continued)

OTHER PUBLICATIONS

Chinese Patent Office, First Office Action (with English translation) issued in corresponding Chinese Application No. 200810135992.3, 8 pages, Apr. 13, 2010.

(Continued)

*Primary Examiner* — Jingge Wu
*Assistant Examiner* — Sean Motsinger
(74) *Attorney, Agent, or Firm* — Trop, Pruner & Hu, P.C.

(57) ABSTRACT

A technique includes converting a first value for a pixel that is associated with a lower bit depth into a second value for the pixel, which is associated with a higher bit depth based at least in part on a neighborhood of the pixel.

21 Claims, 2 Drawing Sheets

U.S. PATENT DOCUMENTS

2009/0097763 A1  4/2009  Chui
2010/0008418 A1  1/2010  Wu et al.

FOREIGN PATENT DOCUMENTS

JP    2007-266749    11/2007

OTHER PUBLICATIONS

U.S. Patent Application entitled, "Bit Depth Enhancement for Scalable Video Coding," filed on Oct. 15, 2007 concurrently herewith.
U.S. Appl. No. 11/974,686, Office Action dated Aug. 11, 2011.

* cited by examiner

CONVERTING VIDEO AND IMAGE SIGNAL BIT DEPTHS

BACKGROUND

The invention generally relates to converting video and image signal bit depths.

Modern display devices (computer monitors, televisions, mobile device screens, etc.) have ever increasing abilities to display images that have relatively high dynamic ranges. In general, an image that has a relatively higher dynamic range has more bits per pixel value, called the "bit depth," than an image that has a relatively lower dynamic range.

A video signal may have a lower associated bit depth than the maximum bit depth capability of a given display device. Therefore, the video signal may be processed to produce another video signal that has a higher bit depth for purposes of driving the display device. One traditional approach for converting bit depth involves tone mapping. In general, tone mapping includes linear scaling, piecewise interpolation and table look-up techniques to specify the per pixel mapping between the low and high bit depth video signals.

A video encoder that generates the low bit depth video signal typically generates additional tone mapping data (such as look-up table data) that describes the tone mapping, and at the display device end, a video decoder receives this additional tone mapping data along with the low bit depth video signal. The video decoder typically constructs the high bit depth signal from the low bit depth signal according to the accompanying tone mapping data. A particular challenge associated with the above-described tone mapping approach is that transmission bandwidth and/or storage bandwidth may be consumed for purposes of storing and/or transmitting the tone mapping data.

DETAILED DESCRIPTION

Figure 1:
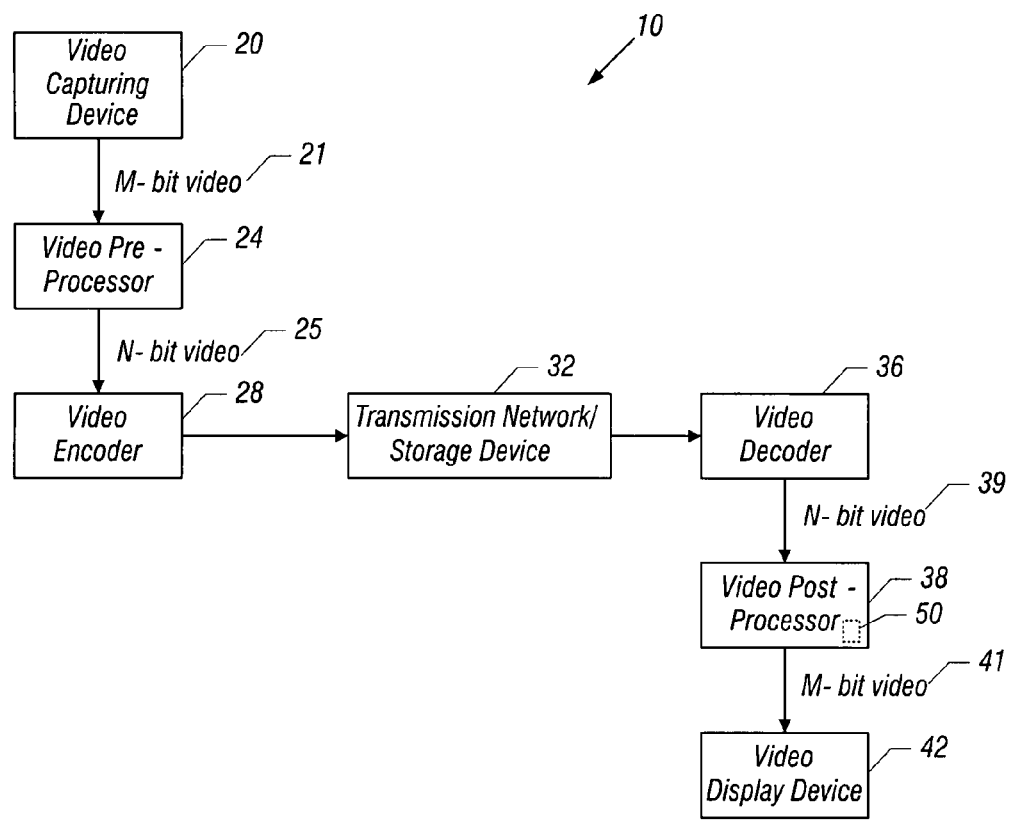
FIG. 1 is a block diagram of a video system according to an embodiment of the invention.

Referring to FIG. 1, an embodiment 10 of a video system in accordance with the invention includes a video display device 42 that has an associated bit depth of M (ten bits per pixel value, as a non-limiting example). Thus, the video display device 42 is capable of displaying images that are defined by pixel values that each have M bits. In other words, the video display device 42 is capable of displaying a video image where the color space of each pixel of the image is defined by M-bit pixel values (one M-bit pixel value per color space component).

Although the video display device 42 is capable of displaying a video that corresponds to an M-bit video signal, a video decoder 36 of the system 10, which generates a video bit stream for the video display device 42 produces a video signal 39 that has a bit depth of N (eight bits per pixel value, as a non-limiting example) that is less than the M bit depth. For purposes of converting the N-bit video signal 39 into the M-bit video signal 41 for the display device 42, the video system 10 includes a content adaptive bit depth enhancer 50. In general, the bit depth enhancer 50 bases the bit depth conversion solely on information that is gleaned from the N-bit video signal 39, without relying on additional information (such as tone mapping data, for example) that describes the bit depth conversion mapping. As a result, the video system 10 saves transmission and/or storage bandwidth, as compared to the bandwidth that is consumed by conventional video systems that perform bit depth conversion.

In general, the video system 10 includes a video capturing device 20, which captures successive frames of image data to form an M-bit video signal 21. A video pre-processor 24 converts the M-bit video signal 21 into an N-bit video signal 25 (i.e., a signal having a bit depth of N). A video encoder 28 compresses the N-bit video signal 25 to form an encoded video stream that may be stored in a storage device and/or transmitted over a transmission network, as indicated at reference numeral 32. As examples, the transmission network may be a wireless network, a local area network (LAN), a wide area network (WAN), the Internet, a cellular network, a television broadcast network, etc. The storage of the encoded video stream may involve the storing of the encoded video stream on a disc, hard drive, CD-ROM, storage area network (SAN), web server, server farm, etc. Regardless of the particular transmission network or storage device, the encoded video stream may be eventually received/retrieved from the transmission network/storage device 32 and provided to an end device that is associated with the video display device 42 and includes the video decoder 36. The video decoder 36 decompresses the encoded video stream (having a bit depth of N) to generate the N-bit video signal 39.

As described below, the bit depth enhancer 50 converts each N-bit pixel value (from the N-bit video signal 39) into a corresponding M-bit pixel value (for the M-bit video signal 41) by taking into account the local neighborhood of the pixel. In this regard, as further described below, for each N-bit pixel value, the bit depth enhancer 50 determines scaling and offset values to apply to the N-bit pixel value to derive the corresponding M-bit pixel value; and the bit depth enhancer 50 determines these scaling and offset values for each N-bit pixel value by examining the pixel values for the corresponding pixel neighborhood.

Figure 3:
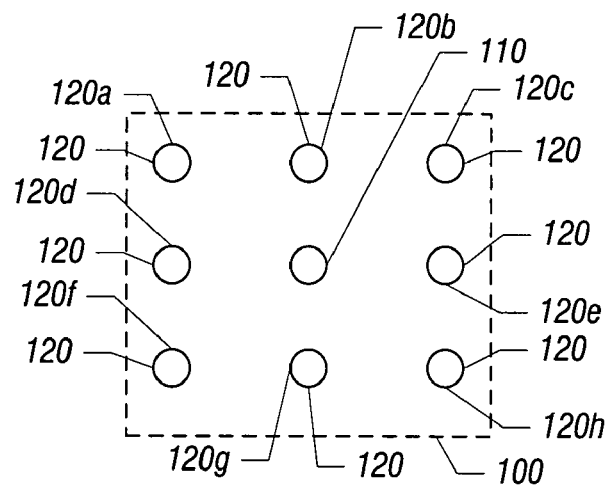
FIG. 3 is an illustration of a local pixel neighborhood according to an embodiment of the invention.

The pixel neighborhood pertains to the N-bit video signal 39 and may, as an example, be formed from the pixels that are closest to the target pixel whose pixel value is being converted to a higher bit depth. The pixel neighborhood may alternatively be the co-located neighborhood of the target pixel in a temporally previous picture or the co-located neighborhood of the target pixel in a temporally future picture. The boundaries of the pixel neighborhood may be user defined, in accordance with some embodiments of the invention. Referring to FIG. 3, as a specific non-limiting example, the pixel neighborhood may be a three pixel-by-three pixel neighborhood 100 (herein called a "three-by-three neighborhood") that includes a target pixel 110 (the pixel whose value is being converted to a higher bit depth) at its center and eight adjacent pixels 120 (specific adjacent pixels 120*a-h* being described below). For this example, the target pixel 110 is the center of the three-by-three neighborhood 100, with four adjacent pixels 120*a*, 120*c*, 120*f* and 120*h* being located diagonally from the target pixel 110, two adjacent pixels being located to the left (pixel 120*d*) and right (pixel 120*e*) of the target pixel 110, and two adjacent pixels being located above (pixel 120*b*) and below (pixel 120*g*) the target pixel 110. As noted above, the neighborhood 100 may be the neighborhood of the target pixel in the present picture (i.e., the picture currently being represented by the N-bit video signal 39) or may be the co-located neighborhood of the target pixel in a temporally previous or future picture. Thus, the bit depth enhancer 50 processes present, temporally previous and/or temporally future pictures for purposes of the bit depth conversions.

Referring to FIG. 3 in conjunction with FIG. 1, the bit depth enhancer 50 analyzes pixel values from the neighborhood 100 (i.e., pixel values from the target 110 and adjacent 120 pixels of the neighborhood 100) for purposes of determining the scaling and offset values to apply to the pixel value of the target pixel 110. It is noted that the target pixel value and in general, all neighborhood pixel values correspond to the same color component of a given color space. Thus, the bit depth enhancer 50 may convert the bit depths of multiple pixel values that correspond to the same pixel, as each pixel value may correspond to a different color component.

The specific type of content that is extracted from the neighborhood pixel values and used for purposes of the bit depth conversion may vary, depending on the particular embodiment of the invention. As a specific example, several factors are set forth below, which may form a basis for the bit depth conversion. However, it is understood that other types of content may be extracted from the neighborhood pixel values and used for purposes of bit depth conversion, in accordance with other embodiments of the invention.

In accordance with some embodiments of the invention, the bit depth enhancer 50 may apply an edge detection metric for purposes of detecting the presence of vertical, horizontal or diagonal edges in the neighborhood. The detected presence of an edge in the neighborhood may be used as a basis to deem that the neighborhood is not sufficiently homogenous for bit depth prediction that is based on the local neighborhood pixel values, as further described below. To the contrary, the non-detection of an edge in the neighborhood may be used to deem that the neighborhood is sufficiently homogenous for bit depth prediction that is based on the local neighborhood pixel values.

As a more specific example, for the case where a three-by-three neighborhood is used, an edge detection technique may be used that applies a Sobel edge operator to the three-by-three neighborhood. The Sobel edge operator may be defined as follows in Eqs. 1, 2, 3 and 4 below:

$$E\_h = \begin{bmatrix} -1 & -2 & -1 \\ 0 & 0 & 0 \\ 1 & 2 & 1 \end{bmatrix},$$ Eq. 1

$$E\_v = \begin{bmatrix} -1 & 0 & 1 \\ -2 & 0 & 2 \\ -1 & 0 & 1 \end{bmatrix},$$ Eq. 2

$$E\_P45 = \begin{bmatrix} -2 & -1 & 0 \\ -1 & 0 & 1 \\ 0 & 1 & 2 \end{bmatrix}, \text{ and}$$ Eq. 3

$$E\_N45 = \begin{bmatrix} 0 & -1 & -2 \\ 1 & 0 & -1 \\ 2 & 1 & 0 \end{bmatrix}.$$ Eq. 4

Eq. 1 is the component of the edge operator directed to detecting a horizontal edge; Eq. 2 is the component of the edge operator directed to detecting a vertical edge; Eq. 3 is the component of the edge operator directed to detecting a positive forty-five degree edge; and Eq. 4 is the component of the edge operator directed to detecting a negative forty-five degree edge.

Given the above-defined edge operator, an edge metric, called "EM(x)," may be formulated as the convolution of the weighting in Eqs. 1, 2, 3 and 4 in a three-by-three neighborhood (called "NH9(x)" below), as follows:

$$EM(x) = |NH9(x)*E\_h| + |NH9(x)*E\_v| + |NH9(x)*E\_P45| + |NH9(x)*E\_N45|.$$ Eq. 5

In Eq. 5, the target pixel value in the N-bit signal is denoted by "x."

The bit depth enhancer 50 compares the edge metric EM(x) to a predefined threshold for purposes of determining whether an edge has been detected in the neighborhood. Thus, if the edge metric EM(x) is above the predefined threshold, the bit depth enhancer 50 determines that an edge has been detected. Otherwise, the bit depth enhancer 50 assumes that no edge has been detected.

It is noted that other edge operators, other than the Sobel edge operator, may be used in accordance with other embodiments of the invention. Additionally, the use of the horizontal (Eq. 1) and vertical (Eq. 2) edge operator components may be sufficient for edge detection, without the use of the diagonal (Eqs. 3 and 4) edge components, in accordance with other embodiments of the invention. Thus, many variations are contemplated and are within the scope of the appended claims.

The neighborhood contains k pixels, and the value of k depends on the particular definition of the neighborhood. For example, for the three-by-three neighborhood 100 example of FIG. 3, k is equal to nine. As another example, the number of k neighboring pixels may be twenty-five for a five-by-five neighborhood. As yet another example, the number of k neighboring pixels may be five, for the case in which a neighborhood of two pixels above and below the target pixel as well as two pixels to the left and right of the target pixel are considered. Thus, many variations are contemplated and are within the scope of the appended claims.

In accordance with some embodiments of the invention, the bit depth enhancer 50 may gather the following local neighborhood statistics for each target pixel value: the average of the k neighborhood pixel values, called "avg_k," and the variance of the k neighborhood pixel values, called "var_k." From these statistics the bit depth enhancer 50 determines a deviation measure, called "dev_x," which is described as follows:

$$dev\_x = (x - avg\_k)/(var\_k + C),$$ Eq. 6 where "C" represents a user pre-defined constant value.

Referring to FIG. 1, in general, the bit depth enhancer 50 converts the N-bit target pixel value x from the N-bit signal 39 into an M-bit target pixel value y of the M-bit signal 41 in accordance with the following relationship:

$$y = a*x \ominus b,$$ Eq. 7 where "a" represents a scaling factor value, "b" represents an offset value, and "⊖" represents a sign operator. The a scaling factor value and b offset value are functions of the pixel values in the corresponding neighborhood, as described below. In general, the a scaling factor value follows a non-linear function, in that the bit depth enhancer 50 sets the a scaling factor value equal to M less N (as a non-limiting example) if no edge is detected (i.e., if the edge metric EM(x) is less than a predefined threshold) and modifies the a scaling factor value if an edge is detected.

As a specific example, M may be equal to ten (corresponding to ten bits per pixel value) and N may be equal to eight (corresponding to eight bits per pixel value). Therefore, M has a range of 1024 ($2^{10}$), which is four times greater than the range of N, which is 256 ($2^8$). When an edge is detected, the bit depth enhancer 50 may ignore the local pixel neighborhood (due to the heterogeneous nature of the neighborhood) and set the a scaling factor value to four (due to the relative ratio of the ranges) and set the b offset value to zero. However, when no edge is detected, the bit depth enhancer 50 adjusts the bit depth conversion based on the local neighborhood by setting the a scaling factor to M-N (or another default value) and setting the b offset value to a value determined by the local neighborhood pixel content, as further described below.

In accordance with some embodiments of the invention, when no edge is detected (i.e., when the edge metric EM(x) is below the predefined threshold), the bit depth enhancer 50 sets the offset value b as a function of a deviation measure called "dev_x," which is described below:

$$b=d^*dev\_x, \qquad \text{Eq. 8}$$

where "d" represents a pre-defined constant value.

The sign operator $\Theta$ in Eq. 7 may be described as follows:

$$\Theta=f(x-(avg\_k+TH)), \qquad \text{Eq. 9}$$

where "TH" represents a user-specified threshold value. The function "f" represents a sign function, which may be controlled by a signal from the video encoder 28, in accordance with some embodiments of the invention. Alternatively, the function f may be derived at the decoder side or may be specified according to a user definition, as just a few examples of the many different embodiments of the invention.

In accordance with some embodiments of the invention, the bit depth enhancer 50 may be part of a video post processor 38, which may contribute additional video quality enhancement. According to the various needs of the application, the enhancement may involve the application of a regular Gaussian filter to smooth the video quality, a contrast enhancement filter to increase the contrast, an image enhancement filter to increase the sharpness, and/or a color enhancement filter to increase the color gamut. The video quality enhancement stage, in accordance with some embodiments of the invention, may operate at the higher M-bit depth and be directed to the enhancement for the specific needs of the video display device 42.

Many variations are contemplated and are within the scope of the appended claims. For example, although the bit depth conversion of video signals is described above, the bit depth conversion techniques may likewise be applied to signals that communicate still images, in accordance with other embodiments of the invention.

The advantages of the bit depth enhancer 50 may include one or more of the following. The bit depth enhancer 50 enhances the picture quality of a lower bit depth video/image by utilizing the characteristic of local content. The bit depth enhancer 50 predicts the signal of the higher bit depth from the signal of the lower bit depth through the features derived from the signal of lower bit depth, and the bit depth enhancer 50 inherits the desirable property of self-construction due to no additional overhead is needed to convey in the bitstream. The bit depth enhancer 50 predicts the signal of the higher bit depth from the signal of the lower bit depth through the neighborhood statistics and local content. The bit depth enhancer 50 utilizes the local edge detection of the low bit depth signal to adapt the construction of high bit depth signal. The bit depth enhancer 50 utilizes the local content statistic of low bit depth signal to adapt the construction of high bit depth signal.

Figure 2:
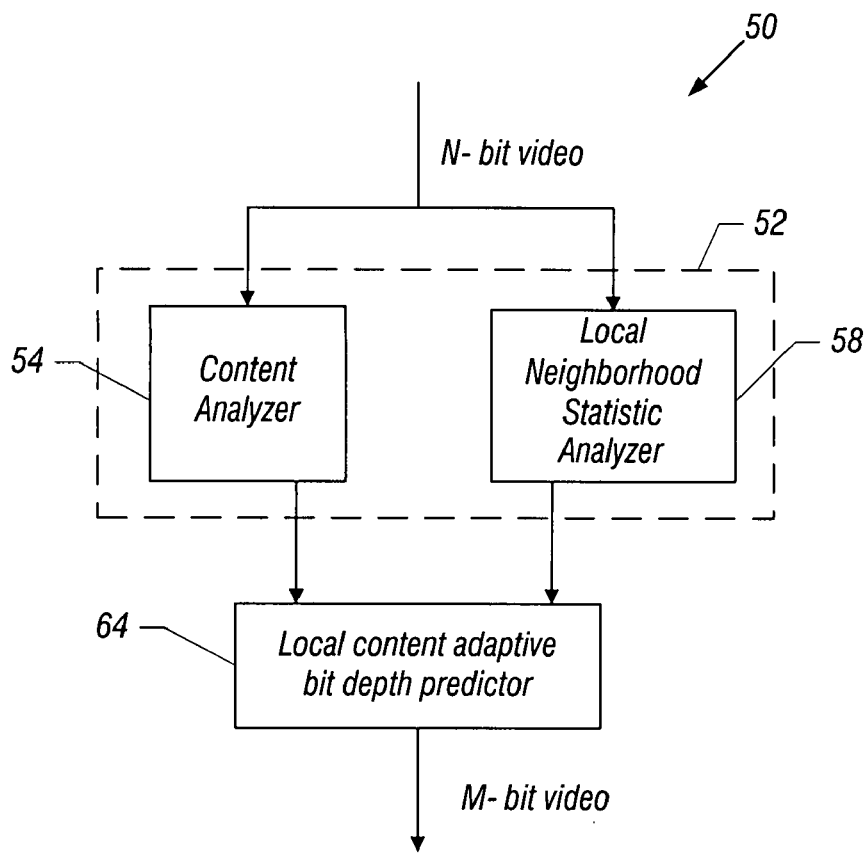
FIG. 2 is a block diagram of a content adaptive bit depth enhancer according to an embodiment of the invention.

FIG. 2 depicts a block diagram of the bit depth enhancer 50 in accordance with some embodiments of the invention. The bit depth enhancer 50 includes a local neighborhood content analyzer 52, which gathers information regarding the local neighborhood of each target pixel value. In this regard, the analyzer 52 may include a content analyzer 54 that performs such analysis as edge detection, and the analyzer 52 may also include a local neighborhood statistic analyzer 58 that gathers various local neighborhood statistics, such as the average pixel value, deviation and variance. Based on the information acquired by the analyzer 52, a local content adaptive bit predictor 64 of the bit depth enhancer 50 applies Eq. 7 in the manner that is set forth above to perform the bit depth conversion.

While the present invention has been described with respect to a limited number of embodiments, those skilled in the art, having the benefit of this disclosure, will appreciate numerous modifications and variations therefrom. It is intended that the appended claims cover all such modifications and variations that falls within the true spirit and scope of this present invention.

What is claimed is:

1. A method comprising:
converting a first value for a pixel associated with a first picture and a lower bit depth into a second value for the pixel associated with a higher bit depth, the converting comprising:
identifying a neighborhood of the pixel from a second picture different from the first picture;
extracting the neighborhood from the second picture;
processing the neighborhood to generate an indicator for an edge in the neighborhood;
based on the indicator, determining a scaling factor of a scaling function to apply to the first value; and
applying the scaling function to the first value using the determined scaling factor to generate the second value.

2. The method of claim 1, wherein the neighborhood comprises a co-located neighborhood associated with a temporally future picture.

3. The method of claim 1, wherein the neighborhood has a bit depth domain associated with the lower bit depth.

4. The method of claim 1, wherein the act of converting comprises converting the first value into the second value based at least in part on characteristics of additional pixels located near the pixel.

5. The method of claim 1, further comprising:
detecting edges in an image indicated by the neighborhood, wherein the act of converting is based at least in part on results of the detection.

6. The method of claim 1, further comprising:
determining pixel values of the neighborhood, wherein the act of converting is based at least in part on the determined pixel values.

7. The method of claim 6, further comprising:
determining an average of the determined pixel values, wherein the act of converting is based at least in part on the average.

8. The method of claim 6, further comprising:
determining a variance of the determined pixel values, wherein the act of converting is based at least in part on the variance.

9. An article comprising a non-transitory computer readable storage medium to store instructions that when executed by a processor-based system cause the processor-based system to:
convert a first value for a pixel associated with a first picture and a lower bit depth into a second value for the pixel associated with a higher bit depth, the conversion comprising:
identifying a neighborhood of the pixel from a second picture different from the first picture;

extracting the neighborhood from the second picture;

processing the neighborhood to generate an indicator for an edge in the neighborhood;

based on the indicator, determining a scaling factor of a scaling function to apply to the first value; and applying the scaling function to the first value using the determined scaling factor to generate the second value.

10. The article of claim 9, wherein the neighborhood comprises a co-located neighborhood associated with a temporally future picture.

11. The article of claim 9, wherein the neighborhood has a bit depth domain associated with the lower bit depth.

12. The article of claim 9, the storage medium storing instructions that when executed cause the processor-based system to determine pixel values of the neighborhood.

13. The article of claim 12, the storage medium storing instructions that when executed cause the processor-based system to determine an average of the determined pixel values.

14. The article of claim 12, the storage medium storing instructions that when executed cause the processor-based system to determine a variation of the determined pixel values.

15. An apparatus comprising:

an analyzer to, in response to a first signal indicative of lower bit depth values for pixels of a first picture, identify neighborhoods of the pixels in a second picture different from the first picture, extract the neighborhoods from the second picture, and process the neighborhoods to generate indicators for edges in the neighborhoods; and a predictor comprising a processor-based machine to, based on the indicators, determine scaling factors of a scaling function to apply to the first signal and apply the scaling function to the first value using the determined scaling factors to generate the second signal.

16. The apparatus of claim 15, wherein the analyzer determines an average pixel value for each neighborhood.

17. The apparatus of claim 15, wherein the analyzer determines a variance of pixel values for each neighborhood.

18. The method of claim 1, wherein the neighborhood comprises a co-located neighborhood associated with a temporally previous picture.

19. The article of claim 9, wherein the neighborhood comprises a co-located neighborhood associated with a temporally previous picture.

20. The method of claim 1, wherein the neighborhood comprises a subset of pixels less than a set of pixels associated with the entire second picture.

21. The apparatus of claim 15, wherein the neighborhood comprises a subset of pixels less than a set of pixels associated with the entire second picture.

* * * * *